United States Patent Office 2,974,177
Patented Mar. 7, 1961

2,974,177

SEPARATION OF A DRYING OIL AND PURE CYCLOPENTENE FROM A MIXTURE OF PIPERYLENE AND CYCLOPENTENE BY POLYMERIZATION

Paul F. Warner and Danny P. Sims, Phillips, Tex., assignors to Phillips Petroleum Company, a corporation of Delaware No Drawing. Filed Feb. 19, 1959, Ser. No. 794,232

5 Claims. (Cl. 260—666)

This invention relates to a novel drying oil. In one of its aspects, it relates to a drying oil obtained by the polymerization of piperylenes. In another of its aspects, the invention relates to a process for the polymerization of piperylenes present in a $C_5$ or amylenes fraction. In a further aspect of the invention, it relates to the polymerization of an amylenes fraction containing piperylene employing a sodium dispersion as catalyst. In a further aspect of the invention, it relates to the production of purified cyclopentene present in an amylenes fraction, for example, as obtained in a dehydrogenation process. In another of its aspects, this invention relates to the obtaining of 2-methyl butene-1 and trans pentene-2 from a mixture of piperylene and cyclopentene using a sodium dispersion catalyst.

The following tabulation lists the composition and boiling points for the compounds in a charge which can be used in this invention.

| Component | Boiling Point, F. | Composition, wt. percent, Charge |
|---|---|---|
| trans Piperylene | 107.66 | 38.4 |
| cis Piperylene | 111.32 | 25.8 |
| Cyclopentene | 111.64 | 35.8 |

From the foregoing table, it is evident that cis piperylene and cyclopentene have boiling points which makes their separation by fractionation practically impossible.

We have found that the piperylenes can be quantitatively polymerized with sodium dispersion at conditions similar to those used in production of liquid polybutadiene leaving the cyclopentene in 90 to 95 percent purity from a starting mixture which contained only 36 percent cyclopentene. Reaction conditions were 220° F., 20–30 p.s.i.g. pressure, and sodium 1–2 percent. Reaction time was 4 to 5 hours for quantitative conversion of piperylenes. The reactor effluent could be readily separated by fractionation to recover pure and research grade cyclopentene.

The reactor effluent had the following composition:

| Component | Boiling Point, F. | Composition, wt. percent, Effluent |
|---|---|---|
| 2-Methyl Butene-1 | 87.98 | 3.1 |
| trans Pentene-2 | 97.44 | 1.2 |
| trans Piperylene | 107.66 | trace |
| cis Piperylene | 111.32 | 0.0 |
| Cyclopentene | 111.64 | 95.7 |

It is an object of this invention to produce a drying oil. It is a further object of this invention to produce a drying oil from a hydrocarbon fraction containing piperylene. It is a further object of this invention to produce pure cyclopentene from a fraction containing it and cis piperylene. It is a still further object of this invention to convert piperylene in a mixture of hydrocarbons containing the same to 2-methyl butene-1 and trans pentene-2. It is a further object of this invention to produce a polymerized piperylene suitable for use as a drying oil.

Other aspects, objects, and the several advantages of this invention are apparent from a study of the disclosure, and the appended claims.

According to this invention, a mixture of $C_5$ unsaturated hydrocarbons containing essentially cis and trans piperylenes and cyclopentene is contacted at an elevated temperature and pressure suitable to maintain liquid phase with a sodium dispersion catalyst for a time sufficient to substantially quantitatively convert the piperylenes to polymer which can be readily separated by fractionation from the reaction mass. Further, according to the invention, upon fractionation, there is obtained a substantially pure cyclopentene, essentially free from piperylene. Still further according to the invention, there is obtained upon said fractionation, as desired, 2-methyl butene-1 and trans pentene-2.

From the data above given, one skilled in the art in possession of this disclosure will recognize that in the production of the drying oil of the invention, a starting mixture containing only 36 percent of cyclepentene can be upgraded substantially quantitatively to produce an essentially pure cyclopentene fraction.

It will also be obvious to said one skilled in the art in possession of this disclosure that the reaction conditions which have been given can be varied within the scope of the invention. Thus, higher and lower temperatures and higher and lower pressures, as well as different catalyst concentrations and conversion times can be used within departing from the concept of the present invention.

Ranges of reaction conditions now preferred are 150 to 250° F., 15 to 125 p.s.i.g. pressure, 0.5 to 5 percent sodium dispersion catalyst concentration and 0.5 to 5 hours' reaction time.

The sodium dispersion catalyst which is used is similar to that which is used in the production of liquid polybutadiene and other polymers and is one which is prepared by dispersing sodium in kerosene or equivalent hydrocarbon fraction.

It will be noted that the conditions above given are similar to those used in the production of liquid polybutadiene, and generally, one skilled in the art in possession of this disclosure, will be able to depart somewhat from the foregoing conditions or select combinations of conditions within the above-given ranges and yet obtain an acceptable drying oil and/or purified cyclopentene.

The drying oil of this invention is useful in paints and generally in the preparation of protective coatings. Cyclopentene is useful as a solvent in the preparation of paints and plastics and in the pharmaceutical industry both in synthesis work and in analytical work.

The piperylene polymer of the invention is a dark colored, viscous oil.

A source from which the drying oil of the invention can be derived according to the invention is a debutanized aromatic concentrate, for example, as obtained in the process disclosed and claimed in Patent 2,848,522, Forrest E. Gilmore, August 19, 1958. A claim of said patent describes a process which comprises subjecting a normally gaseous hydrocarbon to cracking to obtain a composite product comprising hydrogen and $C_1$ to $C_5$ olefins and paraffins together with minor amounts of readily polymerizable aromatic and unsaturated impurities; cooling said composite product to a temperature such that the cracking reaction ceases; removing oil-insoluble impurities from said composite product; subjecting said product to refrigeration at a temperature in the range 40 to 70° F. and at a pressure in the range 115 to 125 p.s.i.g., whereby a gaseous phase and a liquid phase are obtained; recovering from said gaseous phase a $C_3$–$C_4$ fraction, a $C_2$ fraction, and a fraction comprising methane and hydrogen; and recovering from said liquid phase a $C_4$ and lighter fraction and a $C_5$ and heavier fraction containing substantially all of said readily polymerizable impurities.

In said patent, please note pipe 17 of the drawing and column 4, line 16 et seq., for example. The starting material can be derived from the cracking of a butane, for example, isobutane, and/or from the cracking of propane and/or ethane. Essentially, it is a $C_5$ fraction containing higher molecular weight hydrocarbons which are aromatic and olefinic, essentially diolefinic in character.

Reasonable variation and modification are possible within the scope of the foregoing disclosure and the appended claims to the invention, the essence of which is that piperylene in a $C_5$ olefinic fraction containing it and cyclopentene has been polymerized using a sodium dispersion catalyst to provide a reaction effluent which can be fractionated to obtain essentially pure cyclopentene, a polymerized piperylene drying oil and 2-methyl butene-1 and trans pentene-2, substantially as described.

We claim:

1. The polymerization of piperylenes in a hydrocarbon fraction containing essentially cis and trans piperylenes and cyclopentene which comprises contacting said mixture with a sodium dispersion polymerization catalyst at an elevated temperature and under a pressure sufficient to maintain liquid phase and for a time sufficient to convert a substantial portion of said piperylenes to polymer which can be separated from a reaction mass thus obtained by fractionation.

2. The method of simultaneously producing essentially pure cyclopentene and a drying oil from a mixture consisting essentially of cis and trans piperylenes and cyclopentene which comprises contacting said mixture with a sodium dispersion polymerization catalyst under polymerization conditions for a time sufficient to convert the piperylenes substantially to polymers and separating the reaction product into an essentially pure cyclopentene fraction and a piperylene polymer containing drying oil fraction.

3. The method of claim 2 wherein said polymerization conditions are a temperature of 150° F. to 250° F. and a pressure sufficient to maintain said mixture in liquid phase.

4. The method of claim 2 wherein said polymerization conditions include a temperature in the range of 150° F. to 250° F. and a pressure of 15 to 125 p.s.i.g.

5. The method of claim 2 wherein said polymerization conditions include a temperature in the range of 150° F. to 250° F. and a pressure of 15 to 125 p.s.i.g. and said time is 0.5 to 5 hours.

References Cited in the file of this patent

UNITED STATES PATENTS

| | | |
|---|---|---|
| 2,530,727 | Ray | Nov. 21, 1950 |
| 2,704,778 | Maisel | Mar. 22, 1955 |
| 2,707,716 | Price | May 3, 1955 |
| 2,753,325 | Banes | July 3, 1956 |
| 2,753,382 | Hamner | July 3, 1956 |
| 2,768,224 | Page et al. | Oct. 23, 1956 |
| 2,862,982 | Cull et al. | Dec. 2, 1958 |